(No Model.)
G. H. EATON.
APPARATUS FOR DETECTING THE PRESENCE OF GAS.
No. 331,119. Patented Nov. 24, 1885.
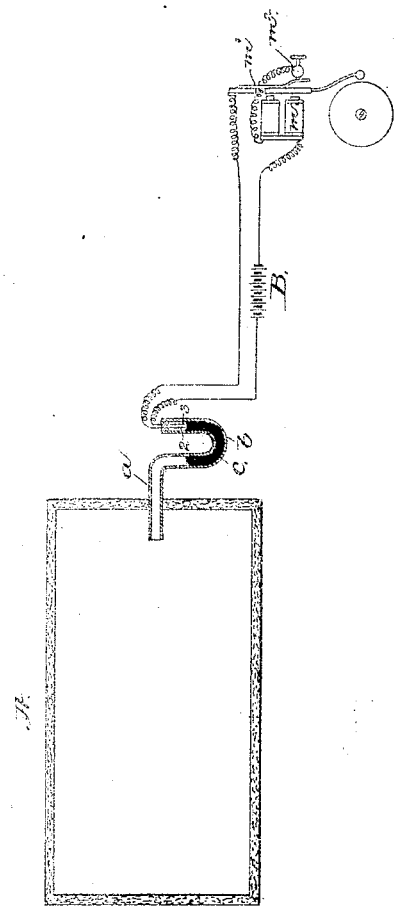
Witnesses.
Inventor:
George H. Eaton
by Crosby & Gregory attys

United States Patent Office.

GEORGE H. EATON, OF NORTH MIDDLEBOROUGH, MASSACHUSETTS.

APPARATUS FOR DETECTING THE PRESENCE OF GAS.

SPECIFICATION forming part of Letters Patent No. 331,119, dated November 24, 1885.

Application filed December 12, 1884. Serial No. 150,206. (No model.)

*To all whom it may concern:*

Be it known that I, GEORGE H. EATON, of North Middleborough, county of Plymouth, and State of Massachusetts, have invented an Improvement in Apparatus for Detecting the Presence of Gas, of which the following description in connection with the accompanying drawing is a specification.

This invention relates to an apparatus for detecting the presence of a foreign gas in the air—as, for instance, for detecting the presence of coal or illuminating gas.

The escape of ordinary illuminating-gas is of common occurrence in cities, caused by some leakage in the pipes or meters, or by carelessly turning on and off a jet, and such escape is frequently attended with serious results, such as suffocation.

The object of the present invention is to produce a simple and cheap apparatus for detecting the presence of the gas and producing a signal when danger is at hand, thus obviating any serious results which might follow.

The invention consists, essentially, of a closed vessel or chamber made of a porous material, and provided with a circuit-closer operated by the volume of gas contained within the said vessel or chamber, said circuit-closer controlling a signaling device. The closed vessel or chamber normally contains air, and when a different gas comes in contact with the said vessel or chamber it passes into the same through its porous walls and forces the air out; but, owing to the natural laws governing osmose of gases, the external gas enters much faster than the air can escape through the porous walls; hence the volume of gas in the chamber increases, and thereby operates the circuit-closer to produce a signal. The circuit-closer in this instance consists of a tube, one end of which passes through the walls of and is sealed to the closed vessel or chamber, and its opposite end is U-shaped. This U-shaped portion is partially filled with dilute sulphuric acid or other good conducting-liquid, and into the open end of one branch of the U-shaped portion is dropped the terminals of an electric circuit, constituting the circuit-closer, by which the signal is controlled.

The drawing shows in longitudinal section an apparatus for indicating the presence of a gas in accordance with this invention, the circuit and signaling device being shown in diagram. The closed vessel or chamber A, made of porous earthenware or other suitable material, and of suitable size, is intended to be placed at any desired spot where it is desired to ascertain the presence of a foreign gas in the atmosphere—as, for instance, over an opening in the floor above a gas-pipe. This vessel A is provided at one end with a circuit-closer, shown in this instance as a tube, $a$, one end of which passes through and is sealed to one wall of the chamber, its opposite end being U-shaped, as at $b$. This U-shaped portion $b$ is partially filled with a conducting-liquid, $c$—such, for instance, as dilute sulphuric acid—and into the open end of this portion $b$ is dropped the terminals 2 3 of the circuit of the battery B, being normally above the level of the liquid in the same branch of the U-shaped portion. I also provide the apparatus with a signaling device, shown as an ordinary vibrating bell in circuit with the said battery B, it comprising a magnet, $m$, a spring-controlled armature, $m'$, to which is connected the striking-lever, and the back contact-point $m^3$.

The operation of the apparatus is dependent upon the natural phenomenon commonly termed "osmose of gases." The vessel A is normally filled with air (the same gas at its exterior) and the liquid in the U-shaped portion is in equilibrium, being at substantially the same level in both branches, and the circuit open, and when a different gas comes in contact with the vessel A an interchange takes place through the porous walls thereof; but, owing to the laws which govern such phenomenon, the external gas enters faster than the air escapes through the walls, thus producing a change in the pressure within the chamber, which causes the liquid in the tube to rise and close the circuit, causing the signal to operate.

It is obvious that the circuit-terminals might pass into the inner branch of the tube and the circuit-terminals dip into the liquid, which will thus retain the circuit normally closed, in which case a signaling-instrument of suitable character would be operated by the opening of the circuit.

I claim—

An apparatus for detecting the presence of a gas, consisting of a closed vessel having porous walls, and a circuit-controlling device operated by variations in pressure of the air in the said vessel when in the presence of gas, and a signaling device controlled thereby, the parts being combined to operate substantially as described.

In testimony whereof I have signed my name to this specification in the presence of two subscribing witnesses.

GEORGE H. EATON.

Witnesses:
BERNICE J. NOYES,
JOS. P. LIVERMORE